Nov. 28, 1950  F. WATSON  2,531,659
MAT
Filed May 23, 1945
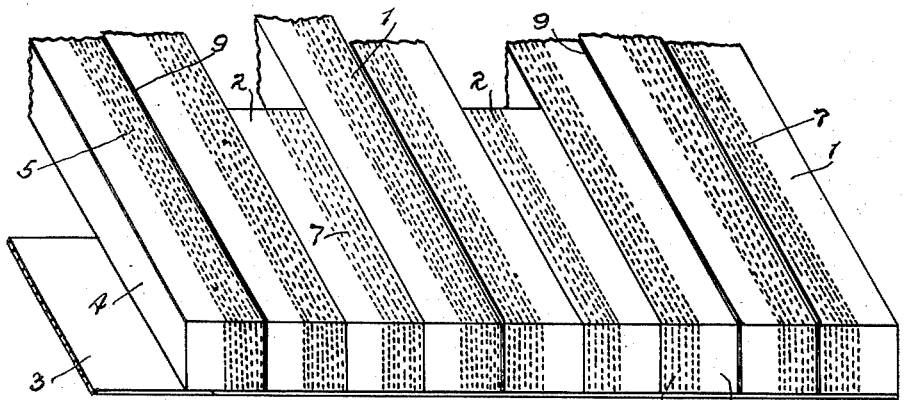
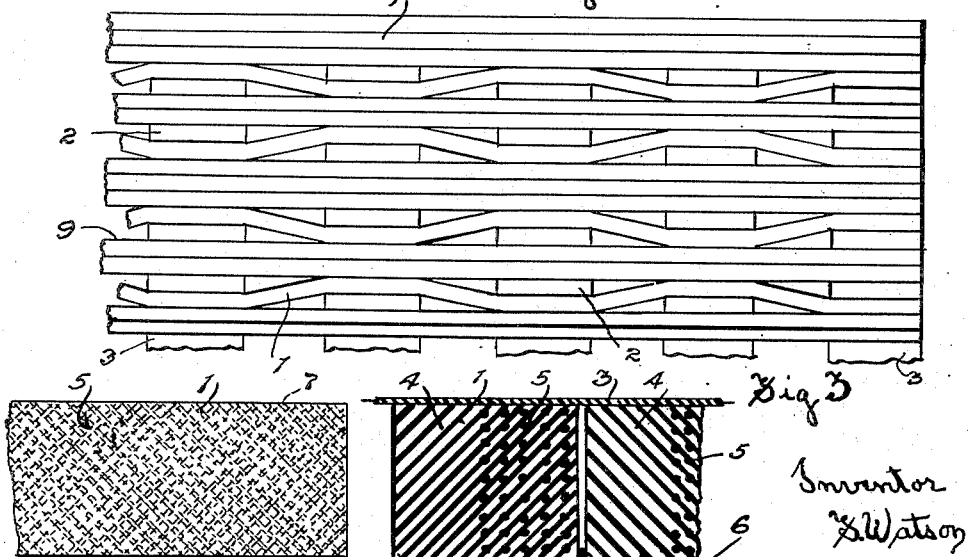
Inventor
F. Watson
By G. S. Roxburgh
His Atty Patented Nov. 28, 1950

2,531,659

UNITED STATES PATENT OFFICE 2,531,659

MAT

Frank Watson, Fort Garry, Manitoba, Canada

Application May 23, 1945, Serial No. 595,383

1 Claim. (Cl. 154—49)

The invention relates to mats and particularly to mats made, for the greater part, from discarded rubber tires and an object of the invention is to provide a mat structure which can be easily and quickly assembled in varying design or pattern and which possesses good wearing and foot cleaning properties and which can be easily cleaned and rolled up as occasion requires.

A further object is to provide a mat of the above type wherein no metallic parts are used in the completed structure, the body strips of the mat and their spacers, being bonded together by underlying straps of tacky, cord reinforced, rubber composition, which becomes semi-vulcanized when exposed to air.

A further object is to so cut the strips and spacers from the tire and to so place them in position in the mat being formed, that the sheared ends of the tire reinforcing cords will be exposed at the top and bottom sides of the completed mat, thereby enhancing the wearing qualities of the mat, and also such that the solid rubber portions of the strips will present sharp edges to provide effective foot cleaners.

A further object is to provide a mat which can be readily assembled when desired with the strips spaced a desired distance apart to allow for expansion and contraction.

With the above more important objects in view the invention consists essentially in the arrangement and construction of parts, hereinafter described, reference being had to the accompanying drawing in which:

Fig. 1 is a perspective view of a portion of a mat constructed according to my invention.

Fig. 2 is a plan view of a portion of a mat, parts being broken away.

Fig. 3 is a plan view view of a portion of a mat of different arrangement to that shown in Fig. 2 and showing how the design of the mat can be readily altered by a varying arrangement of the fillers.

Fig. 4 is an enlarged detailed longitudinal sectional view at 4—4, Fig. 2.

Fig. 5 is an enlarged detailed cross sectional view at 5—5, Fig. 2, and showing how the mat is formed on a table or other flat support.

In the drawing like characters of reference indicate corresponding parts in the several figures.

The mat is made from a number of longitudinally extending rubber composition strips 1 having a number of rubber composition spacers 2 suitably positioned between selected strips and the strips and spacers all bonded together by suitably spaced, underlying, transverse rubber composition straps 3.

The strips 1 and the spacers 2 are cut from discarded rubber composition tires, the tires being cut circumferentially, and being in actual practice about five-eighths of an inch wide and in thickness, that of the tire. The length of the strips 1 used to make a mat, is that of the length of the desired mat, and the width of the mat depends on the number of strips used. The spacers 2 are exactly the same material as the strips 1, only they are short, being just a few inches long.

I have found that aeroplane landing gear tires are highly desirable for mat making purposes. When these are cut into strips and spaced in the manner above indicated, approximately one half of the strip or spacer is solid rubber as indicated at 4 and the other half is cord reinforced, as indicated at 5, the solid rubber part being the tread side of the tire. It will be noted, that when the strips and spacers are being cut, the cord reinforcement is transversely sheared.

When the mat is to be assembled, the desired number of strips 1 are placed side by side on a table or similar support 6 (see Fig. 5) and the spacers 2 are introduced between selected strips depending on the design or pattern of the mat desired. Fig. 2 shows one arrangement and Fig. 3 another, and from these views it will readily be seen that by varying the location and length of the spacers, mats of varying, pleasing design or pattern can be produced. It will be noted that when the mat is being assembled the strips and spacers are placed on their sides on the support, that is, with the sheared ends 7 of the cords visible from the top.

Having placed the strips 1 and spacers 2, as desired, one then applies the tacky bonding straps 3, said straps passing transversely across the then tops of the assembled strips and spacers. I have found that what is known commercially as tire repair cord serves very effectively as the material for the straps. This material comes in rolls and can be torn off to the required width for the straps. It is a cord reinforced rubber composition material having tacky surfaces and when the straps formed from it are pressed firmly against the strips and spacers, they effectively secure the strips and spacers in place and complete the construction of the mat. It will also be noted that the tacky material is of a quick cure nature when exposed to air, and so gives a semi-vulcanized job when the completed mat is left exposed for a short period of time prior to being used.

In locations where the mat might be subjected when in use to a considerable range of temperature, it is desirable to allow for expansion and contraction, as otherwise the mat may not lie flat at all times. This can be accomplished by placing lengths of spacing wires 8 (see Fig. 5) on the table between the strips as the latter are being assembled. These will hold all parts spaced the required distance until the mat is completed. When completed one simply raises the formed mat from the table and the wires fall out.

This mat is quite flexible and can be rolled up from side to side if desired and it is very easily kept clean as any foreign material loosens and falls out when the mat is flexed and shaken. It has good wearing qualities and presents a pleasing appearance and the relatively sharp edges 9 of the solid rubber portions of the strips form effective foot scrapers, giving the well known squeegee effect.

What I claim as my invention is:

A yielding rolling mat comprising a plurality of similar longitudinally extending, spaced, rubber strips half reinforced longitudinally by cord and with the cord extending vertically, spacers of similar material between the strips and appearing in transversely extending rows and relatively thin, flexible, cross strips of rubber composition, underlying the rows of spacers and aforesaid strips and adhesively secured thereto.

FRANK WATSON.

REFERENCES CITED

The following references are of record in the file of this patent:

UNITED STATES PATENTS

| Number | Name | Date |
|---|---|---|
| 239,159 | Gaussen | Mar. 22, 1881 |
| 1,112,649 | Parr | Oct. 6, 1914 |
| 1,352,733 | Egerton | Sept. 14, 1920 |
| 1,550,636 | Robinson | Aug. 18, 1925 |
| 1,815,558 | Gammeter | July 21, 1931 |
| 1,966,465 | Schuhmacher | July 17, 1934 |
| 2,129,622 | Manchester | Sept. 6, 1938 |
| 2,274,468 | Bell | Feb. 24, 1942 |